(12) United States Patent
Ho

(10) Patent No.: US 6,628,472 B1
(45) Date of Patent: Sep. 30, 2003

(54) METHOD AND APPARATUS FOR FEEDFORWARD CANCELLATION USING A PHASE LOCK LOOP

(75) Inventor: Hai T. Ho, Westminster, CO (US)

(73) Assignee: Seagate Technoogy LLC, Scotts Valley, CA (US)

( * ) Notice: Subject to any disclaimer, the term of this patent is extended or adjusted under 35 U.S.C. 154(b) by 352 days.

(21) Appl. No.: 09/686,836

(22) Filed: Oct. 11, 2000

Related U.S. Application Data

(60) Provisional application No. 60/158,837, filed on Oct. 12, 1999.

(51) Int. Cl.[7] .............................................. G11B 5/596
(52) U.S. Cl. .................... 360/77.04; 360/75; 360/77.08
(58) Field of Search ........................... 360/77.04, 77.08, 360/75

(56) References Cited

U.S. PATENT DOCUMENTS

| | | | |
|---|---|---|---|
| 4,594,622 A | 6/1986 | Wallis ........................... 360/77 |
| 4,940,924 A | 7/1990 | Mizuno et al. ............. 318/560 |
| 4,947,093 A | 8/1990 | Dunstan et al. ............. 318/560 |
| 5,072,318 A * | 12/1991 | Yu ............................ 360/77.02 |
| 5,402,400 A | 3/1995 | Hamada et al. ............... 369/32 |
| 5,541,784 A * | 7/1996 | Cribbs et al. ................... 360/75 |
| 5,793,559 A * | 8/1998 | Shepherd et al. ......... 360/78.09 |
| 5,875,066 A | 2/1999 | Ottesen .................... 360/77.11 |
| 5,909,661 A * | 6/1999 | Abramovitch et al. ...... 702/191 |
| 5,949,605 A * | 9/1999 | Lee et al. ................. 360/77.04 |
| 6,002,542 A | 12/1999 | Bruccoleri et al. ....... 360/77.11 |
| 6,021,017 A | 2/2000 | Asamura et al. ......... 360/77.14 |
| 6,061,200 A * | 5/2000 | Shepherd et al. ........ 360/77.04 |
| 6,078,460 A * | 6/2000 | Moriya ..................... 360/77.04 |
| 6,144,516 A * | 11/2000 | Takeda et al. ................. 360/75 |
| 6,144,517 A * | 11/2000 | Watanabe et al. ......... 360/77.04 |
| 6,421,198 B1 | 7/2002 | Lamberts et al. ......... 360/77.04 |
| 6,437,936 B1 | 8/2002 | Chen et al. ............... 360/77.04 |
| 6,476,995 B1 * | 11/2002 | Liu et al. ...................... 360/75 |
| 6,487,035 B1 * | 11/2002 | Liu et al. ................. 360/77.04 |

* cited by examiner

*Primary Examiner*—Richemond Dorvil
*Assistant Examiner*—Jason C Olson
(74) *Attorney, Agent, or Firm*—Theodore M. Magee; Westman, Champlin & Kelly, P.A.

(57) ABSTRACT

A method and apparatus are provided for generating a feedforward cancellation signal for a next sector of a disc in a disc drive. To form the cancellation signal, the method and apparatus generate a trigonometric value having the phase and frequency of a nonrepeatable runout error by passing a position error signal through a phase lock loop. An amplitude is determined for the cancellation signal based on the position error signal. The amplitude is then multiplied by the trigonometric value to from the cancellation signal.

10 Claims, 6 Drawing Sheets

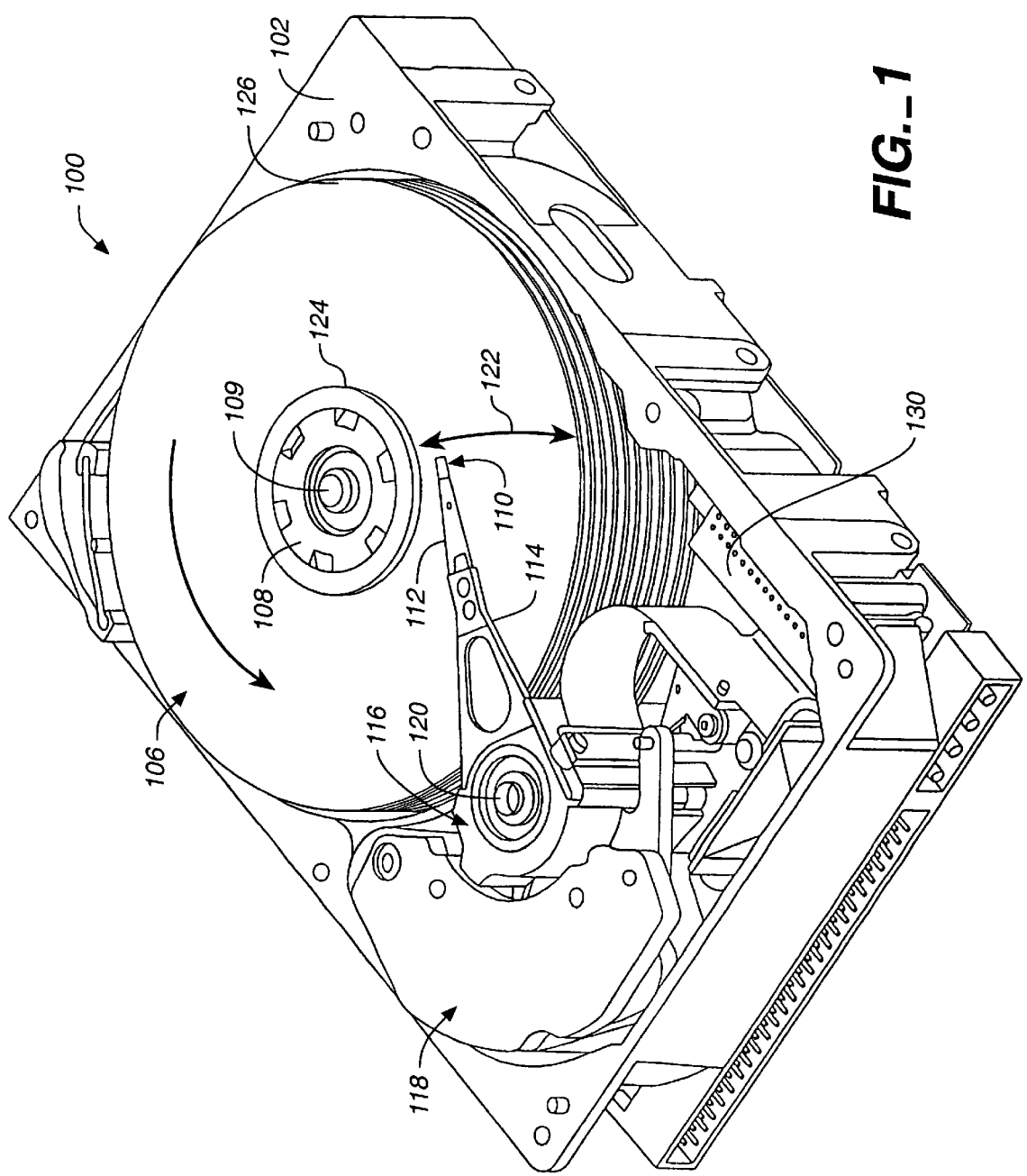

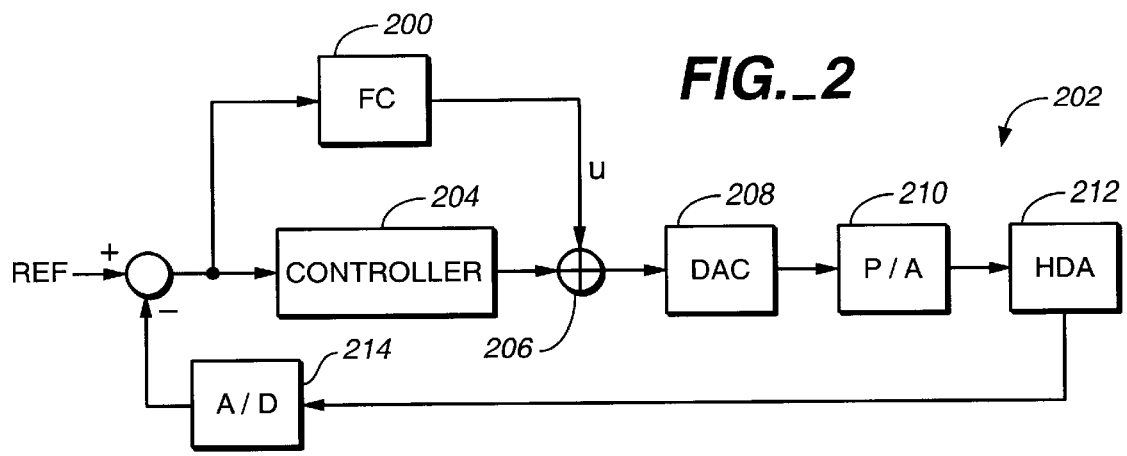
FIG._2
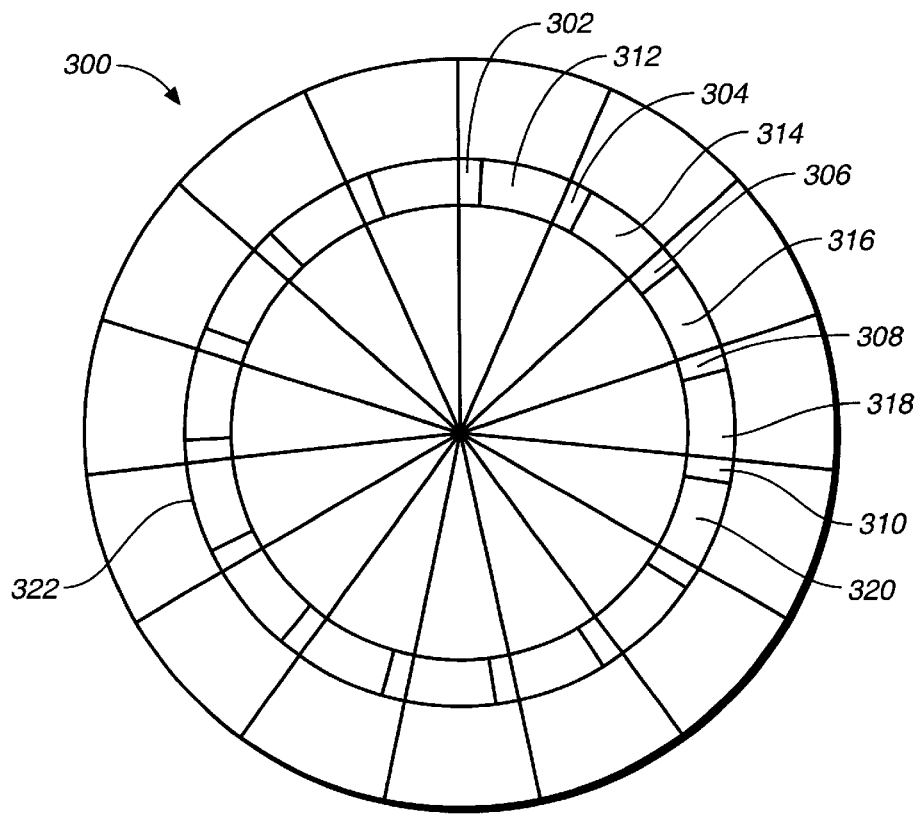
FIG._3

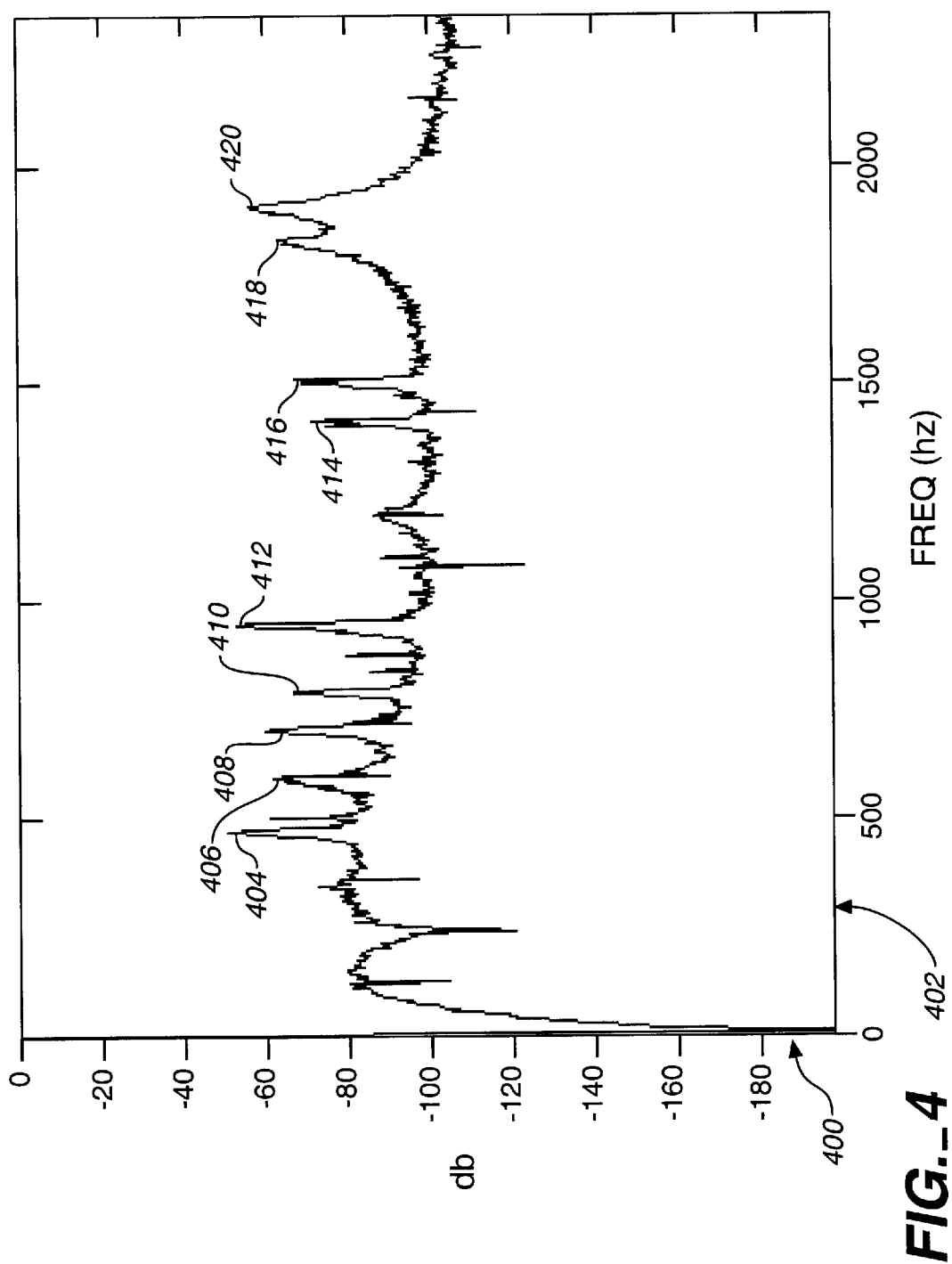
FIG._4

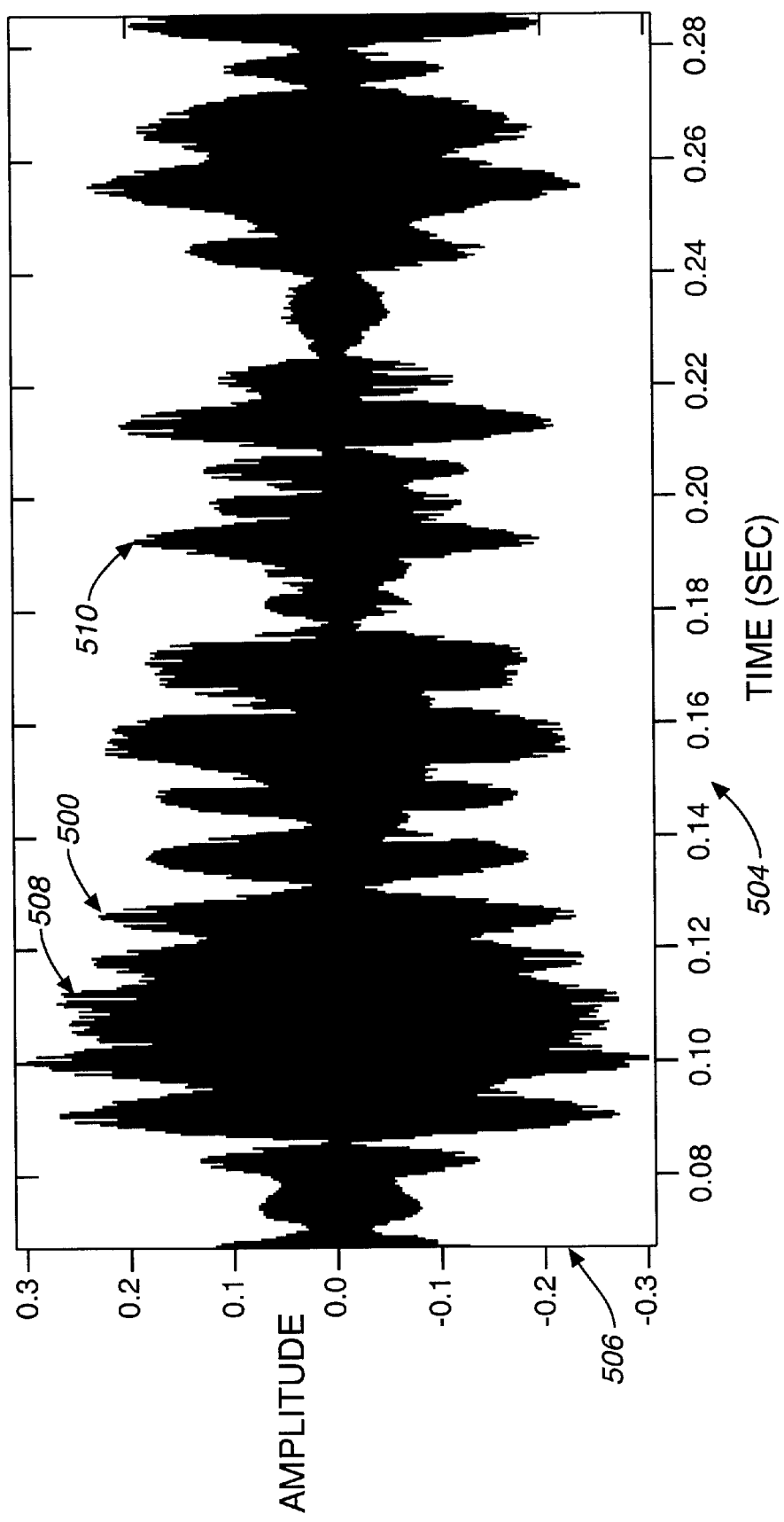
FIG._5

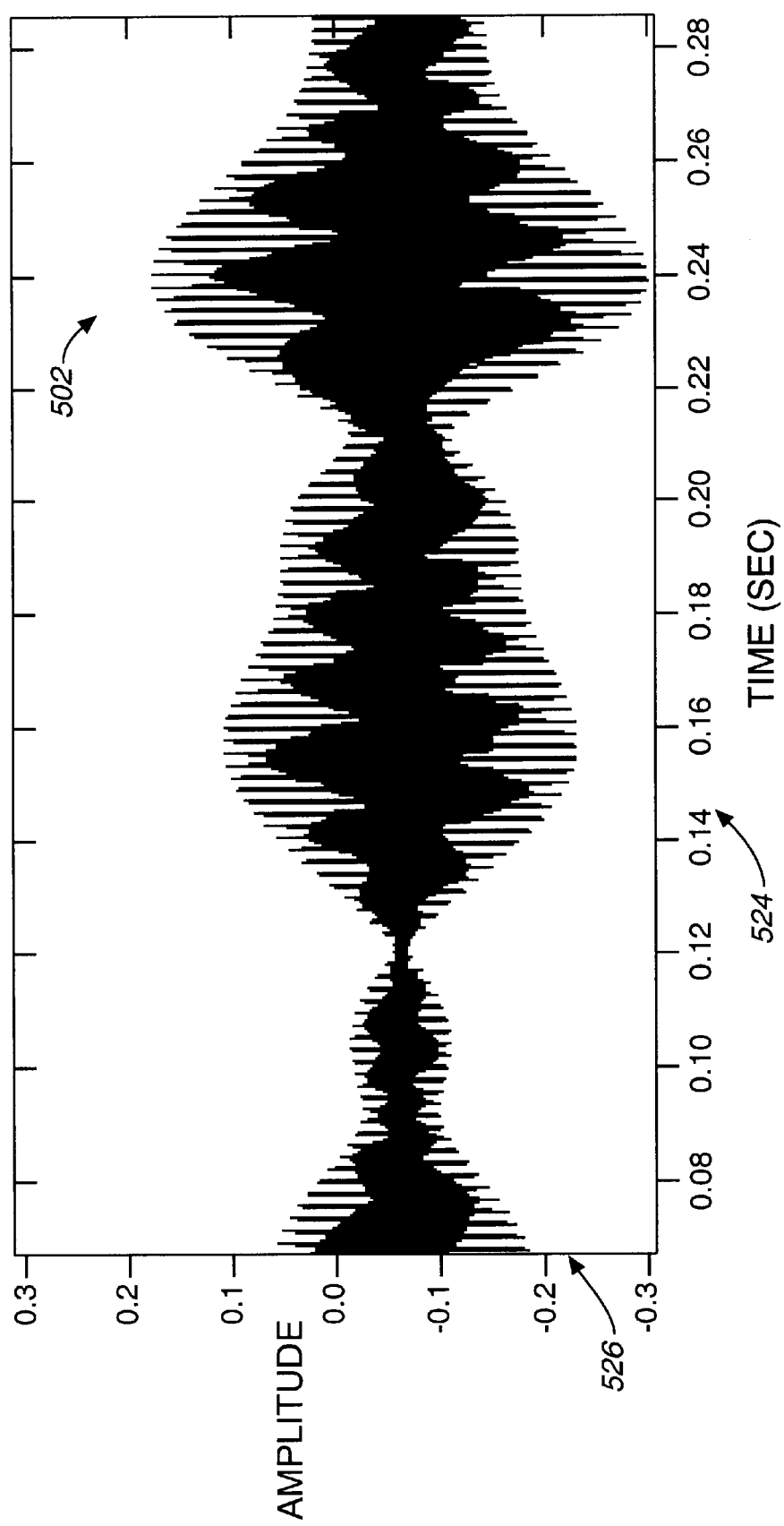
FIG._6

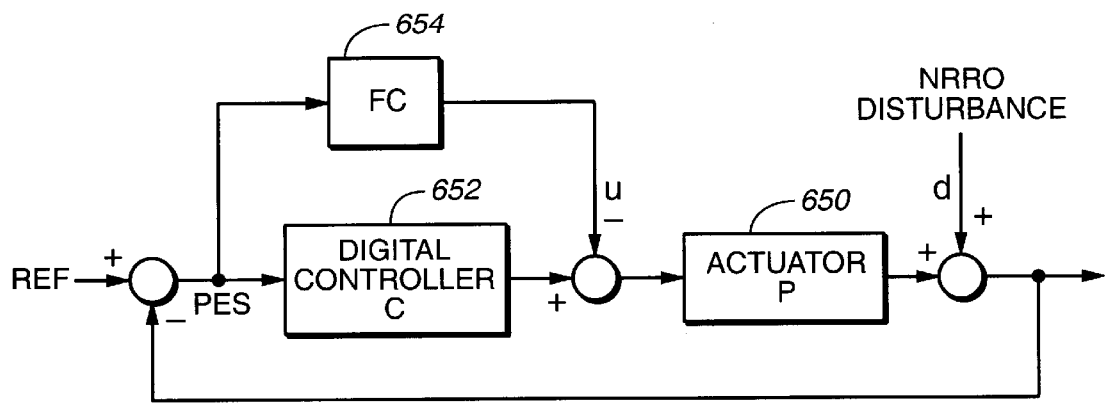
FIG._7
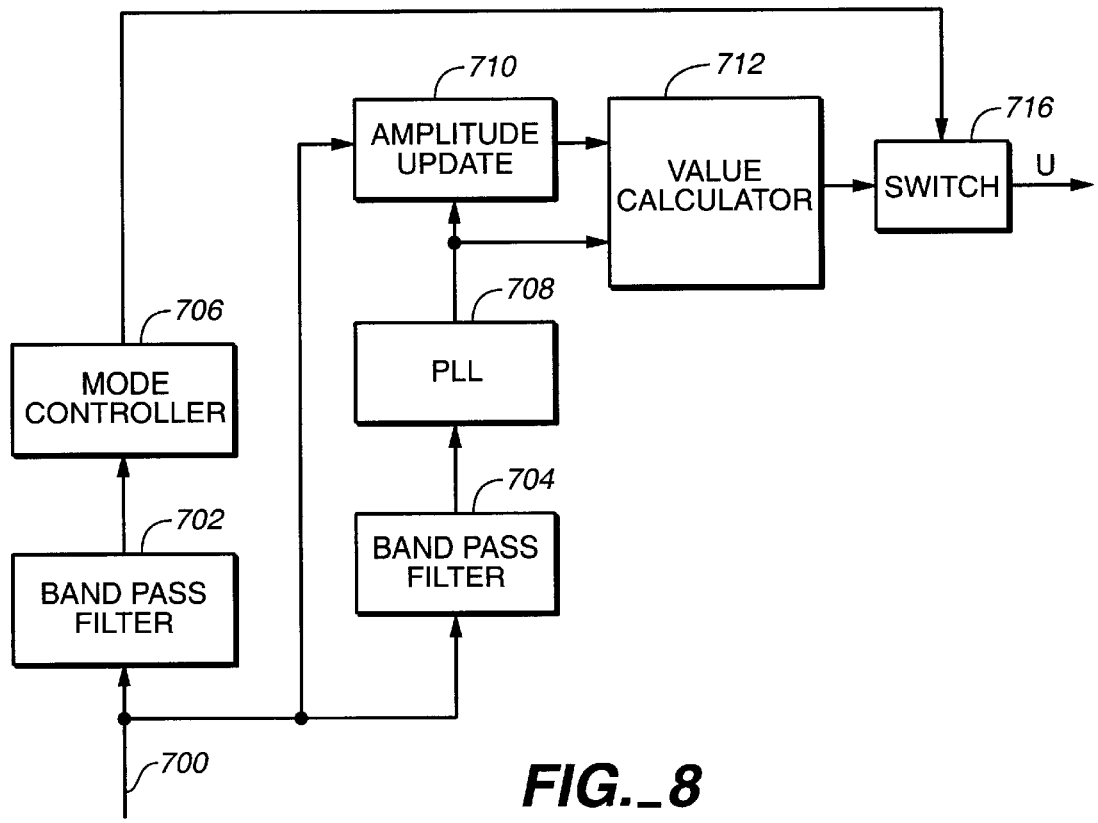
FIG._8

METHOD AND APPARATUS FOR FEEDFORWARD CANCELLATION USING A PHASE LOCK LOOP

REFERENCE TO RELATED APPLICATIONS

The present application claims priority from a U.S. Provisional Patent Application having Ser. No. 60/158,837 filed on Oct. 12, 1999 and entitled METHOD OF USING PHASE-LOCK-LOOP FOR TRACKING NRRO VIA FEED-FOWARD CONTROL.

FIELD OF THE INVENTION

The present invention relates to disc drives. In particular, the present invention relates to runout compensation in disc drives.

BACKGROUND OF THE INVENTION

In a computer disc drive, data is stored on a disc in concentric tracks. In disc drives with relatively high track densities, a servo feedback loop is used to maintain a head over the desired track during read and write operations. This is accomplished utilizing prerecorded servo information either on a dedicated servo disc or on angularly spaced sectors that are interspersed among the data on the disc. During track following, the servo information sensed by the head is demodulated to generate a position error signal (PES), which provides an indication of the position error of the head away from the track center. The PES is then converted into an actuator control signal, which is fed back to an actuator to position the head.

In general, there are two forms of head positioning errors: repeatable and non-repeatable. Repeatable errors, which are generally caused by mechanical irregularities in the structure of the disc drive or errors introduced when writing the servo tracks, can be predicted and therefore theoretically can be cancelled out as they occur. In general, these repeatable runout errors (RRO) are removed by introducing a compensation signal into the servo loop that cancels the repeatable positioning error. Techniques for generating such compensation signals are generally referred to as feedforward cancellation.

Feedforward cancellation is much more difficult to implement for nonrepeatable runout errors (NRRO). Unlike repeatable runout errors, nonrepeatable runout errors do not occur with predictable magnitudes, frequencies or phases. In fact, the magnitude, frequency and phase of a nonrepeatable runout error signal generally change with each rotation of the disc.

One system, discussed by Yu in U.S. Pat. No. 5,072,318, attempts to cancel a nonrepeatable runout error by adaptively changing a cancellation signal at each sector of the disc. Specifically, Yu uses a least squares algorithm to adaptively change the frequency, phase, and amplitude of the nonrepeatable runout cancellation signal at each sector.

Because Yu uses a least squares algorithm to determine the amplitude, frequency and phase of the cancellation signal, it takes time for the Yu algorithm to converge on the proper amplitude, frequency and phase. In addition, because the frequency and phase are utilized in a cosine function when generating the cancellation signal, the least square algorithm cannot converge on the frequency and phase in a linear manner.

The present invention provides a solution to this and other problems, and offers other advantages over the prior art.

SUMMARY OF THE INVENTION

A method and apparatus are provided for generating a feedforward cancellation signal for a next sector of a disc in a disc drive. To form the cancellation signal, the method and apparatus generate a trigonometric value having the phase and frequency of a nonrepeatable runout error by passing a position error signal through a phase lock loop. An amplitude is determined for the cancellation signal based on the position error signal. The amplitude is then multiplied by the trigonometric value to from the cancellation signal.

BRIEF DESCRIPTION OF THE DRAWINGS

FIG. 1 is a perspective view of a disc drive in which aspects of the present invention may be practiced.

FIG. 2 is a block diagram of a servo loop with a feedforward cancellation system.

FIG. 3 is a top view of a disc showing a sector layout used in the present invention.

FIG. 4 is a frequency spectrum of a nonrepeatable runout error.

FIG. 5 is a graph of a component of the nonrepeatable runout error over time.

FIG. 6 is a graph of a second component of the nonrepeatable runout error over time.

FIG. 7 is a simplified block diagram of a servo loop with feedforward cancellation under the present invention.

FIG. 8 is a block diagram of a feedforward cancellation system of the present invention.

DETAILED DESCRIPTION

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

FIG. 2 is a block diagram of a feedforward cancellation system 200 in a servo loop 202 that is found in servo electronics 130. Because the precise structure of the servo loop is not significant to the present invention, servo loop 202 is shown in a simplified form. Those skilled in the art will appreciate that servo loops are more complex than the simple diagram of FIG. 2.

In FIG. 2, servo loop 202 includes a servo controller 204 that receives a reference signal (REF) indicating the desired position for a head on the disc. Based on the reference signal, digital controller 204 generates a digital control value that passes through a cancellation summing node 206 (described further below) and into digital-to-analog converter 208. The digital control value is converted into an analog current by digital-to-analog converter 208 and the analog current is amplified by a power amplifier 210 to produce an actuator control current. The actuator control current is provided to a voice coil motor in a head-disc assembly (HDA) 212 and causes the voice coil motor to move based on the magnitude and polarity of the current. As the voice coil motor moves, head-gimbal assemblies attached to the voice coil motor move across the disc thereby changing the positions of the heads relative to tracks on the disc.

Using servo patterns stored on the disc, a head generates an analog signal that indicates the distance from the head to the track center. The analog signal is provided to an analog-to-digital converter 214, which forms a digital signal from the analog signal. The digital signal is then combined with the reference signal to produce a position error signal (PES) that is fed back to controller 204. Controller 204 uses the position error signal to generate a new digital control value. In particular, controller 204 generates a digital value designed to bring the heads toward the desired track position.

The position error signal is also provided to feedforward cancellation component 200, which generates a cancellation signal for the next sector based on the PES of the current sector. This cancellation signal is provided to cancellation summing node 206, which sums the cancellation signal with the control value generated by controller 204.

In embedded servo systems, the servo information is stored in sectors along the data track. FIG. 3 provides a top view of a disc 300 showing servo sectors 302, 304, 306, 308, and 310 interspersed among data fields 312, 314, 316, 318, and 320 along a track 322. Note that FIG. 3 is not drawn to scale and that most discs have many more servo fields. For example, in one embodiment of the present invention, there are 120 servo fields per track.

Nonrepeatable runout errors can be seen by examining the frequency spectrum of the position error signal measured over several sectors of the disc. An example of such a spectrum is shown in FIG. 4, where the amplitude of the position error signal is shown in decibels along vertical axis 400 and frequency is shown along horizontal axis 402. In FIG. 4, the different modes of the nonrepeatable runout error appear as peaks 404, 406, 408, 410, 412, 414, 416, 418, and 420 in the spectrum.

The peaks shown in FIG. 4 do not remain fixed. Instead, these peaks shift over time as the frequencies of the individual modes of the nonrepeatable runout errors change. It is this frequency shifting that makes it difficult to cancel nonrepeatable runout errors.

As shown in FIGS. 5 and 6, the amplitude of each mode of nonrepeatable errors also changes over time. The changes in the amplitude of the nonrepeatable runout error can be seen in the graphs of FIGS. 5 and 6, which show the amplitude of two modes of the nonrepeatable runout error as a function of time. Mode 500, shown in FIG. 5, represents a 1.7 kilohertz mode of the nonrepeatable runout error and mode 502, shown in FIG. 6, represents a 460 hertz mode of the nonrepeatable runout error. In FIGS. 5 and 6, time is shown along horizontal axes 504 and 524, respectively, and amplitude is shown along vertical axes 506 and 526, respectively. As can be seen in FIGS. 5 and 6, the amplitude of both modes of the nonrepeatable runout error signal varies considerably as a function of time such that the error signals appear as amplitude modulated signals. For example, peak 508 is much larger than peak 510 for mode 500. Because of this modulation in the amplitude, its difficult to converge quickly on an appropriate cancellation signal under the prior art.

As discussed above, the prior art attempted to track these changes in frequency and amplitude by using adaptive feedforward cancellation to cancel the nonrepeatable runout error. Adaptive feedforward cancellation generates a correction value at each sector that is added to the servo loop. In general, this correction value is calculated as:

$$r(n)=m(n)\cos[w(n)t(n)+\phi(n)] \quad \text{EQ.1}$$

where r(n) is the correction value at sector n, m(n) is the amplitude of the nonrepeatable runout cancellation signal at sector n, w(n) is the frequency of the nonrepeatable runout cancellation signal at sector n, t(n) is the time associated with sector n, and φ(n) is the phase of the nonrepeatable runout cancellation signal at sector n.

As discussed above, the prior art uses an adaptive technique to adjust the amplitude, frequency and phase of the nonrepeatable runout cancellation signal. When adaptively changing the amplitude, frequency and phase of the cancellation signal, the prior art does not attempt to measure the amplitude, frequency or phase of the nonrepeatable runout error directly. Instead, the prior art uses the position error signal to generate adaption factors for changing the amplitude, frequency and phase. When generating such adaption values, the prior art must use an adaptive strategy that allows for quick convergence on the new amplitude, frequency and phase of the nonrepeatable runout error while still maintaining stability in the servo system. This is especially difficult for the phase and frequency because they are found in a cosine term in Equation 1. Because of this, the convergence rate is limited and at times, the nonrepeatable runout is not completely cancelled.

The servo loop of FIG. 2 may be simplified by combining elements and assigning a single gain to the combined elements. An example of a simplified block diagram is shown in FIG. 7 where an actuator block 650 with a gain of P is shown in place of digital-to-analog component 208, power amplifier 210, head-disc assembly 212 and analog-to-digital converter 214. Controller 204 of FIG. 2 is shown as controller block 652 in FIG. 7 and has a gain of C. The feedforward cancellation circuit is shown as FC block 654.

In FIG. 7, the nonrepeatable runout disturbance is shown as a disturbance d that is added to the position information output by actuator 650. The feedforward cancellation signal is shown as U, which is subtracted from the control signal produced by controller 652.

FIG. 8 is a block diagram of a feedforward cancellation circuit under the present invention. In one embodiment, the feedforward cancellation circuit of FIG. 8 is implemented entirely in a digital signal processor. In other emodiments, individual components are used.

In FIG. 8, the position error signal is provided on a line 700 to two band pass filters 702 and 704. Band pass filters 702 and 704 help to extract one or more frequency modes from the position error signal. For example, in one embodiment, band pass filters 702 and 704 provide a window around a 1.7 kilohertz bending mode for the disc drive suspension, thereby helping to extract the nonrepeatable runout error due to this bending mode. Although shown as two filters in FIG. 8, band pass filters 702 and 704 may be combined as a single filter. In such embodiments, the output of the filter would be provided to mode controller 706 and phase lock loop 708.

The filtered signal from band pass filter 702 is provided to mode controller 706, which identifies modes of nonrepeatable runout error that have a sufficient amplitude to warrant the construction of a cancellation signal. Mode controller 706 is connected to switch 716 at the output of the feedforward cancellation circuit of FIG. 8.

Mode controller 706 controls whether a cancellation signal will be introduced into the servo loop for a particular mode of nonrepeatable runout error. Under most embodiments of the invention, a separate feedforward circuit, such as the one shown in FIG. 8, is provided for each anticipated mode of nonrepeatable runout error. Under certain operating conditions, the runout error for a particular mode is lower than expected. When this occurs, it is more efficient to ignore that mode than to attempt to introduce a signal to cancel the mode.

Mode controller 706 controls whether a cancellation signal will be introduced into the servo loop by comparing the magnitude of the nonrepeatable runout error for a particular mode to some threshold level. If the amplitude is below the threshold, mode controller 706 opens switch 716 thereby preventing the cancellation signal from being introduced into the servo loop. On the other hand, if the mode's amplitude is above the threshold, mode controller 706 closes switch 716 so that the cancellation signal is provided to the servo loop.

The filtered signal from band pass filter 704 is provided to a phase lock loop 708. Under the present invention, instead of trying to adaptively converge on the frequency and phase of a nonrepeatable runout error, phase lock loop 708 is used to quickly synchronize to the frequency and phase of the nonrepeatable runout error. Specifically, phase lock loop 708 synchronizes an internal voltage controlled oscillator to the frequency and phase of the nonreapeatable runout error by comparing the output of the oscillator to the nonrepeatable runout error signal. Differences between the two signals cause the oscillator to change its frequency in a manner designed to more closely align the two signals. Such phase lock loops are well known in the art. Preferably, a phase lock loop with a convergence rate of less than 5 milliseconds is used in the present invention.

Note that the phase lock loop includes an internal feedback path that is used to synchronize the two signals. As such, the present invention does not have to use the servo loop as the feedback path for synchronizing the cancellation signal with the error signal. Because of this, the present invention can set a high convergence rate for synchronizing the two signals without being as concerned about destabilizing the servo loop. This allows the present invention to converge on the proper cancellation phase and frequency quicker than prior art cancellation systems. In addition, since the phase lock loop is attempting to match one trigonometric signal to another, it can converge in a linear manner.

Note that although the phase lock loop has been described above s with reference to physical internal components, the functions performed by the elements discussed above can be achieved using algorithms within a digital signal processor.

Once synchronized, phase lock loop 708 generates a series of values that represent a trigonometric function that has the same frequency and phase as the signal output by band pass filter 704. In one embodiment, phase lock loop 708 produces a cosine term that varies between −1 and 1. This term is provided to an amplitude update circuit block 710, and a value calculator 712.

Amplitude update block 710 also receives position error signal 700. Using the position error signal and the cosine value from phase lock loop 708, amplitude update block 710 generates a magnitude value for a cosine term that will be injected into the servo loop as the cancellation signal. Specifically, the cancellation signal is formed as:

$$u_r(n) = a(n) \times \cos(wt+\phi) \qquad \text{EQ.2}$$

Where $u_r(n)$ is the cancellation value for sector n, $a(n)$ is the amplitude value determined by amplitude update block 710, and $\cos(wt+\phi)$ is the cosine value generated by phase lock loop 708.

Amplitude update block 710 can use any number of means for generating the amplitude values, including least squares means such as a gradient or a Recursive Least Squares (RLS) technique. For example, in one embodiment the amplitude is estimated as:

$$a(n) = a(n-1) + MU*PES(n)*\cos(wt+\phi) \qquad \text{EQ.3}$$

where $a(n)$ is the amplitude of the cancellation signal calculated from the current sector, $a(n-1)$ is the amplitude for the cancellation signal calculated from the previous sector, MU is a convergance rate, PES(n) is the position error signal at the current sector, and $\cos(wt+\phi)$ is the cosine term provided by phase lock loop 708.

In other embodiments, amplitude update 710 does not require the cosine value from phase lock loop 708. Instead, amplitude update 710 predicts the amplitude of the cancellation signal using a peak detector and a band pass filter. The detected peak of the signal is then used to predict the amplitude of the nonrepeatable runout value for the next sector. Such a peak detector is discussed in more detail in a U.S. Patent Application entitled METHOD AND APPARATUS FOR FEEDFORWARD CANCELLATION USING PEAK DETECTION, having attorney docket number S01.12-0622/SEA 9291 and filed on even date herewith. In such embodiments, an additional filter is added at the output of the feedforward circuit of FIG. 8 before switch 716. This filter has a gain of 1/P(z), which is the inverse of the gain, P(z), provided by actuator block 650. By applying this inverse transform to the calculated cancellation signal, the present invention provides the desired cancellation at the head after the signal has been applied to actuator 650 of FIG. 7. Although it provides certain benefits, the additional filter is not necessary to the practice of the present invention, and those skilled in the art will recognize that it may be removed.

Value calculator 712 calculates the error correction value $u_r(n)$ using equation 2 above. Value calculator 712 receives amplitude value $a(n)$ from amplitude update 710, and $\cos(wt+\phi)$ from phase lock loop 708.

In summary, a method is provided for generating a feedforward cancellation signal, U, for canceling nonrepeatable runout error in a disc drive 100. The method includes generating a position error signal 700 based in part on the position of a head 110 relative to a track 322 on a disc 106. A trigonometric value is produced by passing the position error signal 700 through a phase lock loop 708. An amplitude for the cancellation signal U is then estimated based on the position error signal 700 and the trigonometric value. The amplitude is multiplied by the trigonometric value to produce the cancellation signal.

A servo system 202 for a disc drive 100 is also provided that includes a controller 652 for generating a control signal based in part on a position error signal 700. An actuator-head assembly 650 that includes an actuator 116 and head 110 is capable of moving the head 110 based at least in part on the control signal from controller 652. The actuator-head assembly 650 is also capable of generating a position error signal 700 based on the position of the head 110 over a track. A feedforward cancellation component 654 receives the position error signal 700 and produces a cancellation signal U. The feedforward cancellation component 654 includes a phase lock loop 708, an amplitude update 710, and a value calculator 712. Phase lock loop 708 tracks the phase and frequency of a nonrepeatable runout error in the position error signal 700 and produces a trigonometric value based on the phase and frequency. Amplitude update 710 generates an estimated amplitude for the cancellation signal. The amplitude and the trigonometric value are provided to value calculator 712 which generates the cancellation signal based on the amplitude and trigonometric value.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the cancellation signal may be inserted at different locations within the servo loop without departing from the scope and spirit of the present invention. In addition, the feedforward cancellation circuit may be operated as a digital or analog device. Other modifications can also be made.

What is claimed is:

1. A method of generating a feedforward cancellation signal for canceling nonrepeatable runout position error in a disc drive, the method comprising steps of:
    (a) generating a position error signal based in part on the position of a head relative to a track on a disc in the disc drive;
    (b) passing the position error signal through a phase lock loop to generate at least one trigonometric value;
    (c) estimating an amplitude for the cancellation signal from the position error signal;
    (d) multiplying the amplitude by the trigonometric value to generate the cancellation signal.

2. The method of claim 1 wherein estimating an amplitude for the cancellation signal comprises using a least squares algorithm to estimate the amplitude.

3. The method of claim 1 wherein estimating an amplitude for the cancellation signal comprises utilizing a peak detector to identify a peak in the position error signal.

4. The method of claim 1 wherein passing step (b) further comprises:
    (b)(1) passing the position error signal through a filter to generate a filtered position error signal; and
    (b)(2) passing the filtered position error signal through the phase lock loop to generate the at least one trigonometric value.

5. In a disc drive, a servo system for positioning a head over a track, the servo system comprising:
    a controller capable of generating a control signal based in part on a position error signal generated by the head;
    an actuator-head assembly comprising an actuator and the head and capable of moving the head based at least in part on the control signal from the controller and capable of generating the position error signal based on the position of the head over a track; and
    a feedforward cancellation component capable of receiving a position error signal for a current sector and capable of producing a cancellation signal for a next sector based in part on the position error signal, the feedforward cancellation component comprising:
        a phase lock loop that tracks the phase and frequency of a nonrepeatable runout error in the position error signal and that produces a trigonometric value based on the phase and frequency of the nonrepeatable runout error;
        an amplitude estimator capable of estimating an amplitude for the cancellation signal; and
        a value calculator capable of generating the cancellation signal based on the trigonometric value and the estimated amplitude.

6. The disc drive of claim 5 wherein the feedforward cancellation component further comprises a filter coupled to the phase lock loop and capable of providing a filtered position error signal to the phase lock loop.

7. The disc drive of claim 5 wherein the amplitude estimator utilizes a least squares algorithm.

8. The disc drive of claim 5 wherein the amplitude estimator comprises a peak detector.

9. The disc drive of claim 5 wherein the amplitude estimator is coupled to the phase lock loop and receives the trigonometric value and wherein the estimated amplitude is based in part on the trigonometric value.

10. A disc drive for storing data in tracks along a disc, the disc drive comprising:
    a servo loop for positioning a head relative to a track; and
    feedforward cancellation means coupled to the servo loop for canceling nonrepeatable runout positioning errors using a phase lock loop.

* * * * *

UNITED STATES PATENT AND TRADEMARK OFFICE
CERTIFICATE OF CORRECTION

PATENT NO. : 6,628,472 B1
DATED : September 30, 2003
INVENTOR(S) : Hai T. Ho

It is certified that error appears in the above-identified patent and that said Letters Patent is hereby corrected as shown below:

<u>Title page,</u>
Item [73], Assignee, "Seagate Technoogy LLC" should be -- Seagate Technology LLC --

Signed and Sealed this

Fourth Day of May, 2004

JON W. DUDAS
*Acting Director of the United States Patent and Trademark Office*